US006009005A

United States Patent [19]

Kim

[11] Patent Number: 6,009,005

[45] Date of Patent: Dec. 28, 1999

[54] POWER SUPPLY DEVICE WITH REFERENCE SIGNAL GENERATING CIRCUIT FOR POWER SAVING MODE

[75] Inventor: Hong-Ki Kim, Kyungg-do, Rep. of Korea

[73] Assignee: SamSung Electronics Co., Ltd., Kyungki-do, Rep. of Korea

[21] Appl. No.: 09/203,684

[22] Filed: Dec. 1, 1998

[30] Foreign Application Priority Data

Dec. 1, 1997 [KR] Rep. of Korea .................... 97-35235

[51] Int. Cl.[6] .................................... H02M 7/217

[52] U.S. Cl. .................... 363/95; 363/41; 363/131

[58] Field of Search .................... 363/40, 41, 95, 363/97, 98, 55, 56, 131, 132; 318/802, 805, 811

[56] References Cited

U.S. PATENT DOCUMENTS 4,087,850 5/1978 Koizumi .................... 363/21
4,928,220 5/1990 White .................... 363/56
5,528,483 6/1996 Mohandes .................... 363/21
5,542,035 7/1996 Kikinis et al. .
5,628,001 5/1997 Cepuran .
5,646,572 7/1997 Masleid .
5,650,924 7/1997 Huh .
5,657,257 8/1997 Lee .
5,658,132 8/1997 Akazawa et al. .................... 417/45
5,682,302 10/1997 Wen .................... 363/43
5,684,681 11/1997 Huh .
5,726,871 3/1998 Choi .
5,737,616 4/1998 Watanabe .
5,745,375 4/1998 Reinhardt et al. .
5,754,036 5/1998 Walker .................... 323/237
5,768,111 6/1998 Zaitsu .................... 363/15
5,808,881 9/1998 Lee .
5,812,386 9/1998 Youn .
5,872,710 2/1999 Kameyama .................... 363/95

*Primary Examiner*—Adolf Deneke Berhane
*Attorney, Agent, or Firm*—Robert E. Bushnell, Esq.

[57] ABSTRACT

A power supply device having a transformer for generating at least one output voltage supplied to an electronic apparatus with power saving mode includes: a switching circuit connected to the transformer, a reference signal generator for generating a reference signal having a first high frequency or a second low frequency according to whether the electronic apparatus is in a normal operation mode or a power saving mode, and a PWM control circuit for generating a PWM signal to control the switching operation of the switching circuit according to the reference signal and a feedback signal from the output voltage.

4 Claims, 6 Drawing Sheets

Rectifier Circuit
90
Vin
PWM Control Circuit
102
Switching Circuit
104
Transformer
106
100
Load
130
Vf
Feedback Circuit
108
fb1
Comparator
110
fb3
fb2
120
Mode Detection Circuit
124
D_mod
Controller
126
Cnt1 or Cnt2
Freqency Divider
128
fosc
OSC
122
fosc or fdiv

POWER SUPPLY DEVICE WITH REFERENCE SIGNAL GENERATING CIRCUIT FOR POWER SAVING MODE

CLAIM OF PRIORITY

This application makes reference to, incorporates the same herein, and claims all benefits accruing under 35 U.S.C. §119 from an application for POWER SUPPLY DEVICE WITH REFERENCE SIGNAL GENERATING CIRCUIT FOR POWER SAVING MODE earlier filed in the Korean Industrial Property Office on Dec. 1, 1997 and there duly assigned Serial No. 35235/1997.

BACKGROUND OF THE INVENTION

1. Field of the Invention

The present invention concerns a switching mode power supply device, and more particularly a power supply device with normal operation and power saving modes.

2. Description of the Related Art

The switching mode power supply device generally employs as the reference signal an oscillation signal with a frequency as high as possible, e.g., 100 KHz, in order to increase the transformation efficiency. In the power-off or sleep mode, such an apparatus cuts off all the power sources supplying the load except the power source supplying the circuits for controlling the power saving mode, thus minimizing the power consumption.

An earlier switching mode power supply device which connected between a rectifier circuit and a load with a power saving mode, includes an oscillator, a pulse width modulation (PWM) control circuit, switching circuit and a transformer with multiple secondary coils. The transformer has at least one output voltage delivered to the load, a part of which is fed back to a feedback circuit connected to a comparator.

The oscillator generates an oscillation signal of a high frequency which serves as a reference signal for the PWM control circuit to generate a PWM signal to control the on/off operation of the switching circuit. The feed back circuit feeds a part of the output voltage of the transformer back to the comparator to detect changes in the output voltage depending on the rising and falling of the feedback voltage.

The comparator compares the output feedback signal with an inherent reference signal of the feedback circuit to provide the resultant signal for the PWM control circuit to maintain the output voltage of the transformer at a given value corresponding to the normal operation mode or power saving mode. Namely, the PWM control circuit generates a PWM signal to modify the on-duty interval in response to the oscillation signal and the feedback signal of the feedback circuit, thereby controlling the on/off operation of the switching circuit 23 to control the output voltage of the transformer.

Hence, the switching circuit carries out the switching operation according to the same oscillation signal at both the normal operation mode and the power saving mode, thus increasing the power consumption for the switching operation which reduces the advantage of the power saving mode.

The following patents each discloses features in common with the present invention but do not teach or suggest the specifically recited power supply device with a reference signal generating circuit for the power saving mode of the present invention: U.S. Pat. No. 5,737,616 to Watanabe, entitled Power Supply Circuit With Power Saving Capability, U.S. Pat. No. 5,542,035 Kikinis et al., entitled Timer-Controlled Computer System Shutdown And Startup, U.S. Pat. No. 5,745,375 to Reinhardt et al., entitled Apparatus And Method For Controlling Power Usage, U.S. Pat. No. 5,628,001 to Cepuran, entitled Power Saving Method And Apparatus For Changing The Frequency of A Clock In Response To A Start Signal, U.S. Pat. No. 5,684,681 to Huh, entitled Drive Circuit Of Switching Element For Switching Mode Power Supply Device, U.S. Pat. No. 5,812,386 to Youn, entitled Power Supply Control Method And Corresponding Circuit, U.S. Pat. No. 5,650,924 to Huh, entitled Electric Power Supply Device For A Monitor, U.S. Pat. No. 5,726,871 to Choi, entitled Power Supply Circuit With Power Saving Mode For Video Display Appliance, U.S. Pat. No. 5,657,257 to Lee, entitled Power-Supply Controller Of Computer, U.S. Pat. No. 5,808,881 to Lee, entitled Power-Supply Controller Of Computer, U.S. Pat. No. 5,646,572 to Masleid, entitled Power Management System For Integrated Circuits, and U.S. Pat. No. 5,737,616 to Watanabe, entitled Power Supply Circuit With Power Saving Capability.

SUMMARY OF THE INVENTION

It is an object of the present invention to provide a switching mode power supply device having a reference signal generator which generates a reference signal to reduce the frequency of the on/off operation of the switching circuit in the power saving mode.

According to an embodiment of the present invention, a power supply device having a transformer for generating at least an output voltage supplied to an electronic apparatus with a power saving mode comprises a switching circuit connected to the transformer, a reference signal generator for generating a reference signal having a first high frequency or a second low frequency according to the electronic apparatus being respectively in the normal operation mode or power saving mode, and a PWM control circuit for generating a PWM signal to control the switching operation of the switching circuit according to the reference signal and the feedback signal from the output voltage.

Preferably, the reference voltage generator further includes an oscillator for generating the first high frequency oscillation signal, a mode detection circuit for detecting the operation mode of the electronic apparatus by receiving the feedback signal from the output voltage so as to generate a mode detection signal, a controller for generating a first or a second control signal according to whether or not the mode detection signal is activated, and a frequency divider for transferring the first high frequency oscillation signal to the PWM control circuit upon receiving the first control signal or frequency-dividing the oscillation signal to generate a frequency divided reference signal supplied to the PWM control circuit upon receiving the second control signal.

Thus, the inventive power supply device divides the frequency of the oscillation signal to generate a frequency reduced oscillation signal supplied to the PWM control circuit in the power saving mode detected by the voltage supplied from the transformer to the load. The PWM control circuit generates the PWM signal to adjust the on-duty interval of the switching circuit in response to the frequency reduced signal. Then, the switching circuit performs the switching operation according to the PWM signal generated by the reference signal having a lower frequency than the oscillation signal.

The present invention will now be described more specifically with reference to the drawings attached only by way of example.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF PREFERRED EMBODIMENTS

Figure 1:
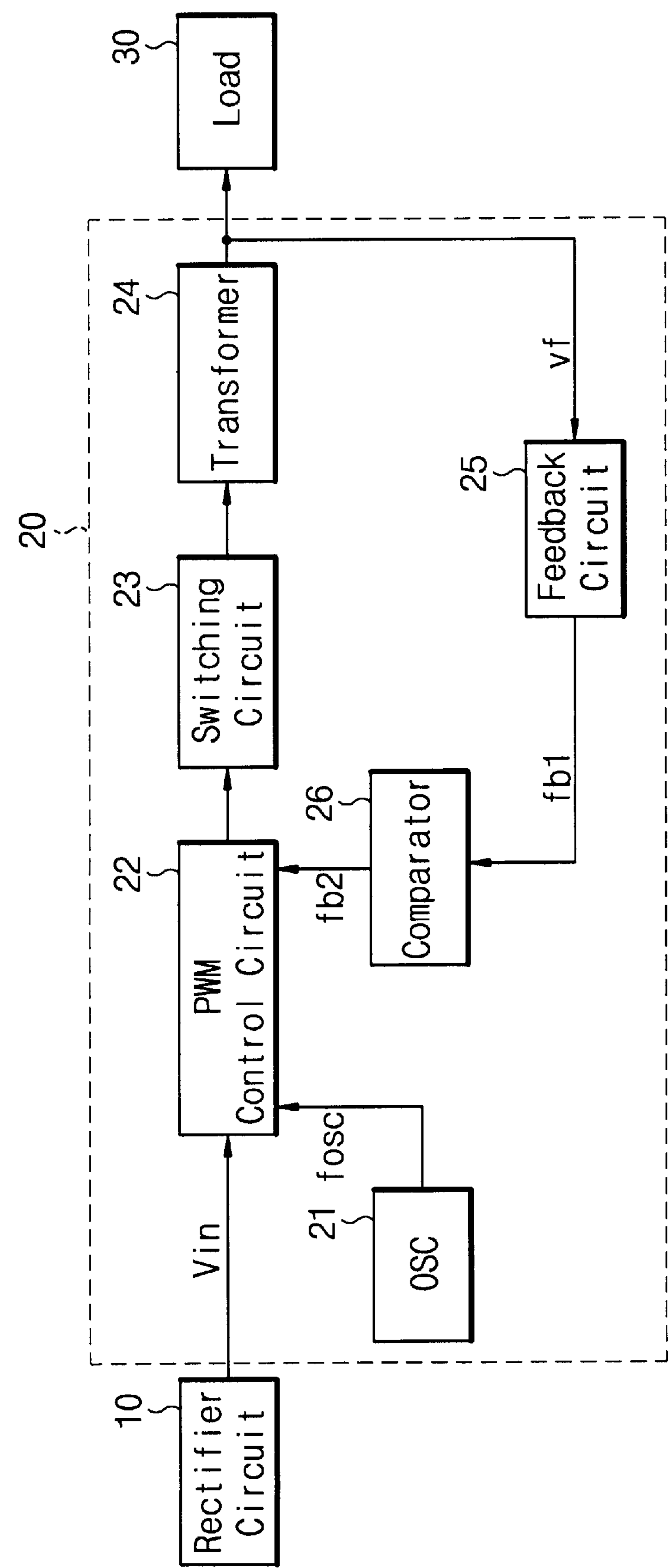
FIG. 1 is a block diagram for illustrating the structure of a switching mode power supply device.

Schematically shown in FIG. 1 is the structure of a switching mode power supply device 20, which is connected between a rectifier circuit 10 and a load 30 with power saving mode, and comprises an oscillator (OSC) 21, a pulse width modulation (PWM) control circuit 22, a switching circuit 23, and a transformer 24 with multiple secondary coils. The transformer 24 has at least one output voltage delivered to the load 30, a part of which is fed back to a feedback circuit 25 connected to a comparator 26.

OSC 21 generates an oscillation signal (fosc) of a high frequency, e.g., 100 KHz, which serves as a reference signal for the PWM control circuit 22 to generate a PWM signal to control the on/off operation of the switching circuit 23. The feedback circuit 25 feeds a part of the output voltage of the transformer 24 back to the comparator 26 to detect changes in the output voltage depending on the rising and falling of the feedback voltage Vf.

The comparator 26 compares the output feedback signal fb1 with an inherent reference signal Vref of the feedback circuit 25 to provide the resultant signal for the PWM control circuit to maintain the output voltage of the transformer at a given value corresponding to the normal operation mode or power saving mode. Namely, the PWM control circuit 22 generates a PWM signal to modify the on-duty interval in response to the oscillation signal fosc and the feedback signal fb2 of the feedback circuit 25, thereby controlling the on/off operation of the switching circuit 23 to control the output voltage of the transformer 24.

Hence, the switching circuit 23 carries out the switching operation according to the same oscillation signal fosc at both the normal operation mode and the power saving mode, thus increasing the power consumption Pd for the switching operation, which reduces the advantage of the power saving mode.

Figure 2:
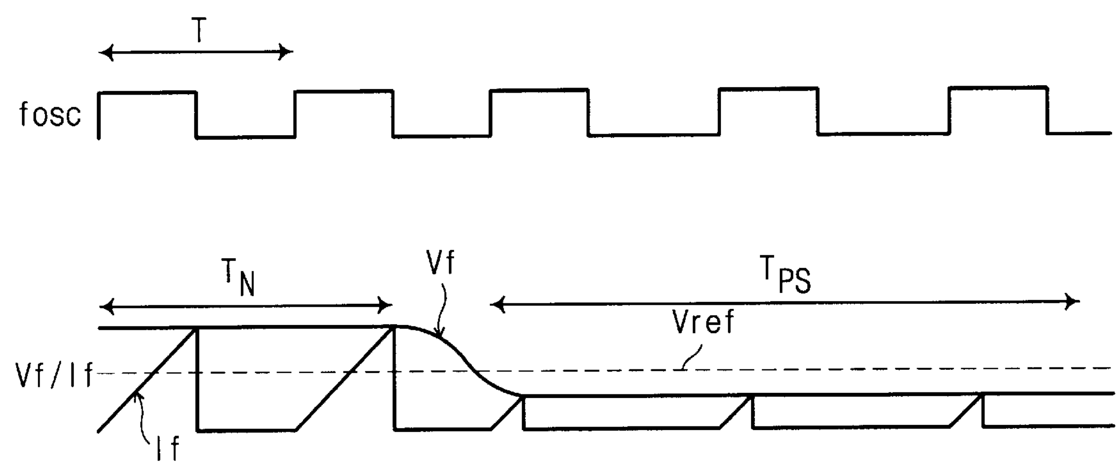
FIG. 2 illustrates the operational waveforms for describing the normal operation mode and power saving mode according to the oscillation signal of the power supply device as shown in FIG. 1.
Figure 3:
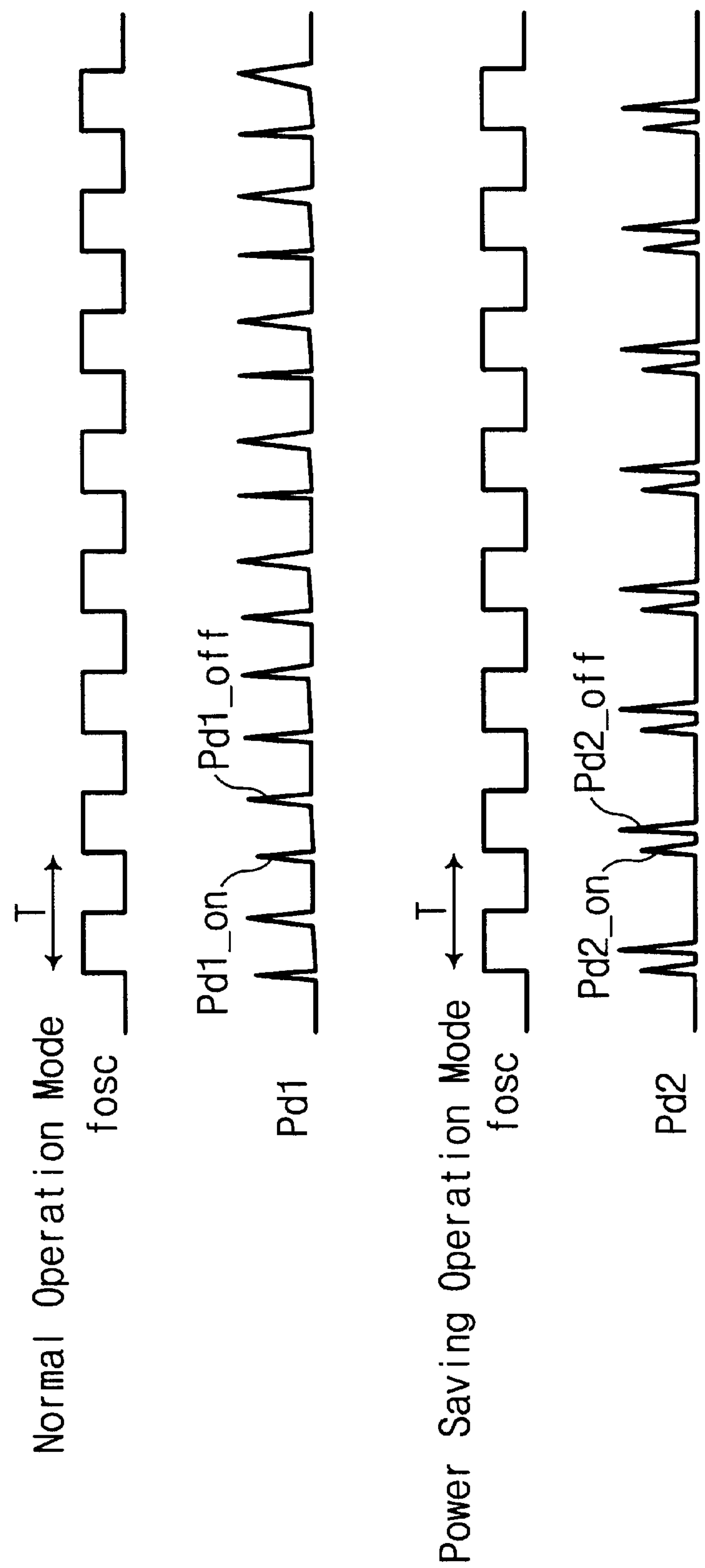
FIG. 3 illustrates the operational waveforms for describing the power consumed by the switching operation according to the oscillation signal of the power supply device as shown in FIG. 1.

More specifically describing the drawbacks of the device of FIG. 1 with reference to FIGS. 2 and 3, there is graphically shown in FIG. 2 the relationship between the feedback voltage Vf and the primary coil current If of the transformer 24 at the normal operation mode interval Tn and the power saving mode interval Tps of the power supply device as shown in FIG. 1. In this case, the energy stored in the primary coil is $1/2LI^2_f$. As shown in FIG. 2, the power consumption becomes low in the power saving mode, so that the primary coil current If is relatively small and the feedback voltage Vf is lower than the reference voltage Vref. The power supply device feeds back a part of the output voltage Vf supplied from the secondary coil of the transformer 24 to distinguish the normal operation mode interval Tn and the power saving mode interval Tps according to the variation of the feedback voltage Vf. In addition, the power supply device is made to supply an oscillation signal fosc of the same frequency to the PWM control circuit 22 at both the normal operation mode and the power saving mode.

Referring to FIG. 3, the switching operation is performed at the rising and falling edges of the PWM signal (not shown) having the same on-duty intervals as the oscillation signal fosc having a period of T in response to it both in the normal operation mode and the power saving mode. Hence, the switching operation is performed at the high frequency of the oscillation signal, thus increasing the power consumption Pd. While the oscillation signal fosc of such high frequency increases the transformation efficiency at the normal operation mode, it decreases the transformation efficiency at the power saving mode because of the high power consumption caused by the high frequency switching operation.

Figure 4:
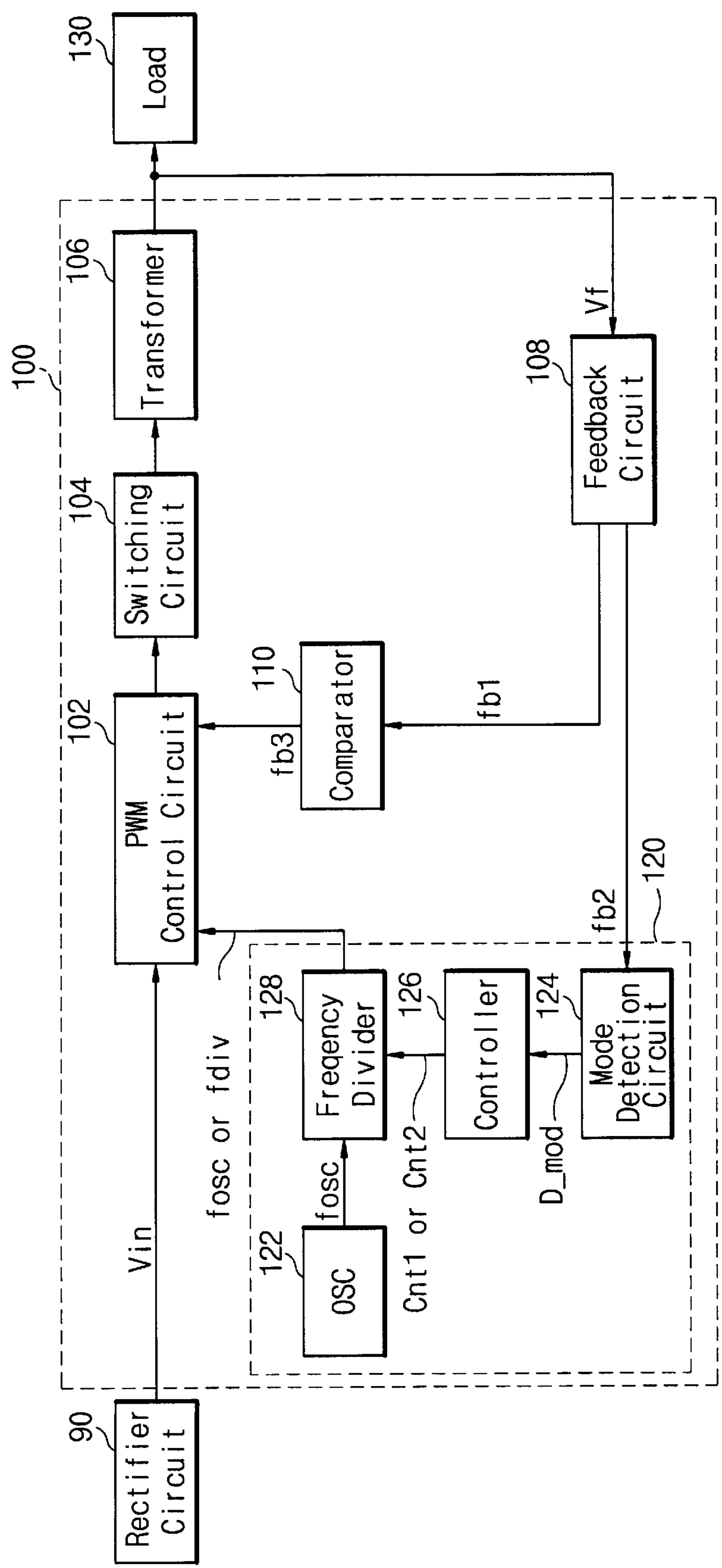
FIG. 4 is a block diagram for illustrating the structure of the inventive switching mode power supply device.
Figure 5:
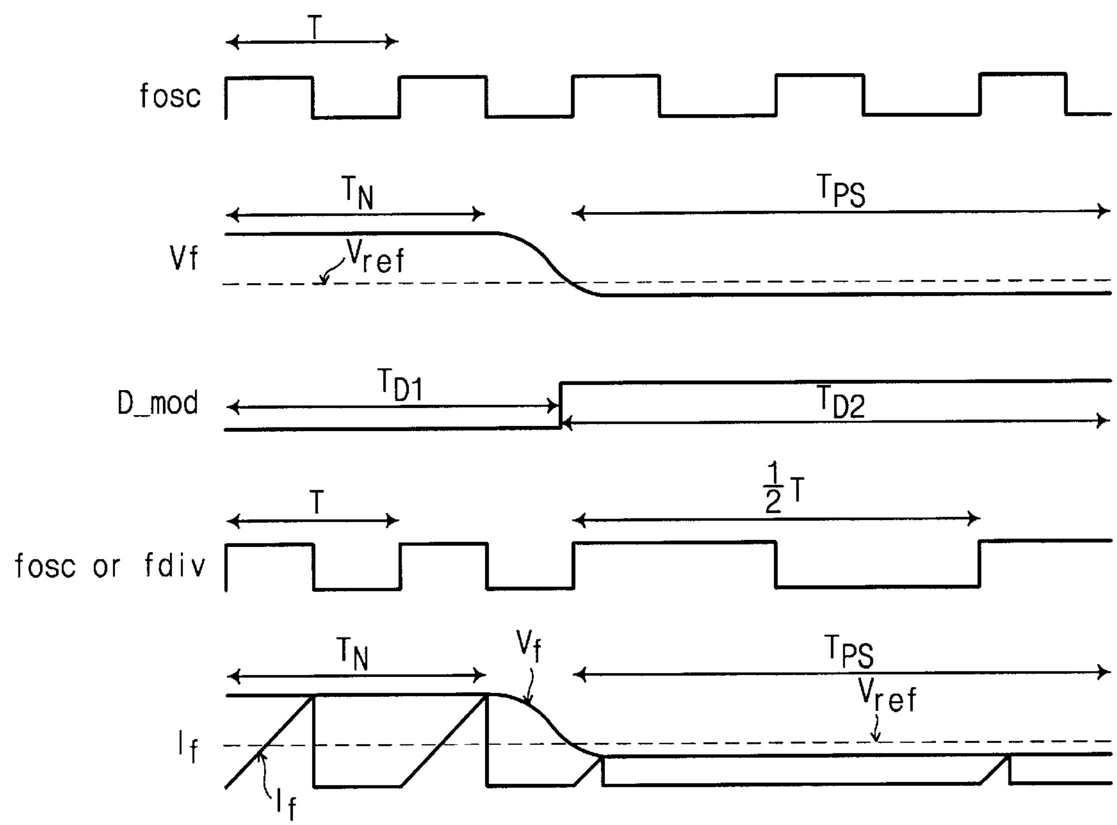
FIG. 5 illustrates the operational waveforms for describing the normal operation mode and power saving mode of the power supply device as shown in FIG. 4 respectively according to the first and the second reference signal.

Referring to FIGS. 4 and 5, there are schematically shown a feedback current taken from the output voltage of the transformer of the inventive power supply device and the waveforms of the primary coil current proportional to the feedback current.

As shown in FIG. 4, a novel reference signal generator 120 is included in the power supply device. Provided between a rectifier circuit 90 supplying a DC voltage and a load 130 having power saving mode are a PWM control circuit 102, a switching circuit 104 and a transformer 106. At least a part of the output voltage of the transformer 106 supplied to the load 130 is fed back via a feedback circuit 108 to a comparator 110, which compares the feedback voltage Vf with an inherent reference voltage Vref to supply the resultant signal fb3 to the PWM control circuit 102. In addition, the reference signal generator 120 includes an oscillator OSC 122, a mode detector 124 and a frequency divider 128.

OSC 122 generates a first frequency oscillation signal fosc. The mode detector 124 receives a feedback signal fb2 from the feedback circuit to detect voltage variations to generate a mode detection signal D_mod supplied to the controller 126. The controller 126 generates a first or second control signal Cnt1 or Cnt2 according to whether or not the mode detection signal D_mod is activated. Consequently, the frequency divider 128 transfers the first high frequency oscillation signal fosc of the oscillator to the PWM control circuit 102 upon receiving the first control signal Cnt1, or divides the frequency of the oscillation signal to generate a frequency divided reference signal fdiv supplied to the PWM control circuit upon receiving the second control signal Cnt2.

The PWM control circuit 102 generates a PWM signal (not shown) to control the on/off operation of the switching circuit 104 according to the reference signal fosc or fdiv and the feedback signal fb3 from the comparator. The switching circuit 104 performs the switching operation between the PWM control circuit 102 and the transformer 106 in response to the PWM signal. The transformer 106 is provided with multiple secondary coils (not shown) to provide the voltages required for the load 130 according to the switching operation. Thus, the reference signal generator 120 generates the first frequency reference signal fosc in the normal operation mode of the load 130, and the second frequency reference signal fdiv having a lower frequency in the power saving mode.

Namely, when the power supply device is in the normal operation mode, and the DC voltage is supplied from the rectifier circuit 90, OSC 122 generates the oscillation signal fosc supplied to the PWM control circuit 102, which turns on or off the switching circuit 104. In response to the switching operation, the transformer 106 stores the energy into the inductor or secondary coil to supply the voltage necessary for the load.

Meanwhile, the feedback circuit 108 detects the voltage variations according to the rising and falling of the output voltage Vf fed back from the transformer 106, transferring the detected variations to the comparator 110, which compares the feedback voltage Vf with the reference voltage Vref to detect the stable voltage according to the normal operation mode or power saving mode, and supplies the resultant signal fb3 to the PWM control circuit 102.

The PWM control circuit 102 adjusts the on-duty interval according to the oscillation signal fosc and the resultant signal fb3 to generate the PWM signal. Then, the switching circuit 104 performs the switching operation to make the output voltage of the transformer 106 constant in response to the PWM signal. In addition, when the power saving mode is demanded by an external device, e.g., a circuit to control the power saving mode, DPMS control circuit, etc., all the power sources are cut off except the power source to maintain the power saving mode.

Hence, the feedback voltage Vf has a short on-duty interval and thus is lowered considerably in the power saving mode as compared with that in the normal operation mode. The mode detection circuit 124 compares the feedback voltage fb2 with the reference voltage Vref to detect the operational mode to generate the mode detection signal D_mod, in response to which the controller 126 supplies the first or second control signal Cnt1 or Cnt2 to the frequency divider 128. If the frequency divider 128 receives the second control signal Cnt2, it divides the first frequency oscillation signal fosc to generate the second frequency reference signal fdiv supplied to the PWM control circuit 102, which then generates the PWM signal to adjust the on-duty interval of the switching circuit 104. Consequently, the switching circuit 104 performs the switching operations at a lower frequency in response to the second frequency reference signal fdiv which has a lower frequency than the first frequency oscillation signal fosc, thereby considerably reducing the power consumption in the power saving mode.

Additionally describing the present invention with reference to FIG. 5, the power supply device detects the operational mode depending on the variation of the feedback voltage Vf, and executes the normal operation mode or power saving mode according as the mode detection signal D_mod causes the first or the second frequency reference signal fosc or fdiv. The mode detection signal D_mod is activated or not according to the result that the mode detection circuit 124 compares the feedback voltage Vf with the reference voltage Vref. Namely, the controller 126 generates the first or second control signal Cnt1 or Cnt2 supplied to the frequency divider 128 according to whether or not the mode detection signal D_mod is activated. Thus, as shown in FIG. 5, the frequency divider 128 generates the first frequency oscillation signal fosc in the normal operation mode interval Tn while dividing the first frequency oscillation signal fosc to generate the second lower frequency reference signal fdiv in the power saving mode interval Tps.

Figure 6:
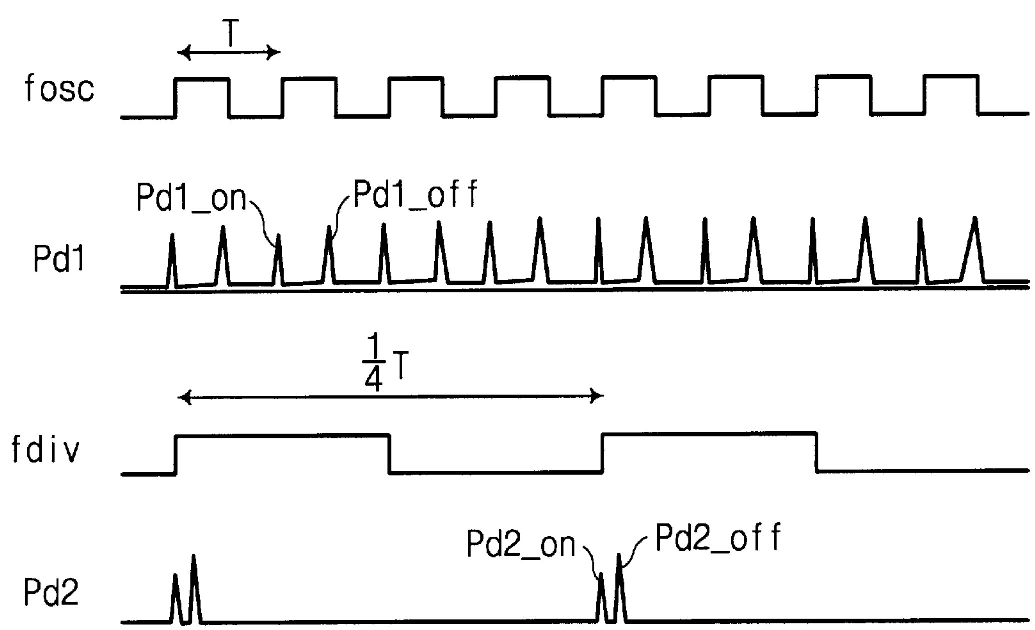
FIG. 6 illustrates the operational waveforms for describing the power consumed by the switching operation according to the first and the second frequency reference signal of the power supply device as shown in FIG. 1.

Referring to FIG. 6 for illustrating the power consumption Pd1 and Pd2 according to the first and the second reference signal fosc and fdiv, the on-duty interval of the PWM signal (not shown) generated by the PWM control circuit 102 is adjusted to have the same value as the first frequency oscillation signal in the normal operation mode Tn. However, in the power saving mode Tps, the second frequency reference signal fdiv obtained by dividing the first frequency oscillation signal makes the on-duty interval of the PWM signal of the PWM control circuit 102 shorter than the first frequency oscillation signal, so that the power consumption due to the on/off operation of the switching circuit 104 becomes Pd2.

The power consumption Pd2 occurs at the rising and falling edges of the PWM signal. The switching circuit is turned on at the rising edge, making the first power consumption Pd2_on, and turned off at the falling edge, making the second power consumption Pd2_off. Thus, the frequency of the switching operations is reduced by the second frequency reference signal fdiv in the power saving mode Tps. For example, assuming that the first frequency oscillation signal have a frequency of 100 KHz and be divided by 4 to generate the second frequency reference signal of 25 KHz, the frequency of the switching operations in the power saving mode is reduced to are quarter of that in the normal operation mode. Hence, the frequency of effecting the power consumption in the inventive device is considerably reduced compared to that of the device shown in FIG. 3.

It should be understood that the present invention is not limited to the particular embodiment disclosed herein as the best mode contemplated for carrying out the present invention, but rather that the present invention is not limited to the specific embodiments described in this specification except as defined in the appended claims.

What is claimed is:

1. A power supply device having a transformer for generating at least one output voltage supplied to an electronic apparatus with power saving mode, comprising:

- a switching circuit connected to said transformer;
- a reference signal generator for generating a reference signal having a first high frequency or a second low frequency according to whether said electronic apparatus is in a normal operation mode or a power saving mode; and
- a pulse width modulation (PWM) control circuit for generating a pulse width modulated signal to control the switching operation of said switching circuit according to said reference signal and a feedback signal from said output voltage.

2. A power supply device as defined in claim 1, said reference signal generator further comprising:

- an oscillator for generating said first high frequency oscillation signal;
- a mode signal generator for detecting the operation mode of said electronic apparatus by receiving a feedback signal from said output voltage so as to generate a mode detection signal;
- a controller for generating a first or a second control signal according to whether or not said mode detection signal is activated; and a frequency divider for transferring said first high frequency oscillation signal to said PWM control circuit upon receiving said first control signal or frequency-dividing said oscillation signal to generate a frequency divided reference signal supplied to said PWM control circuit upon receiving said second control signal.

3. A method of operating a power supply device having a transformer for generating at least one output voltage supplied to an electronic apparatus with power saving mode, comprising the steps of:

providing a switching circuit connected to said transformer;

generating a reference signal having a first high frequency or a second low frequency according to whether said electronic apparatus is in a normal operation mode or a power saving mode; and generating a pulse width modulated signal in a pulse width modulation (PWM) control circuit to control the switching operation of said switching circuit according to said reference signal and a feedback signal from said output voltage.

4. The method of operating a power supply device as defined in claim 3, generating said reference signal further comprising the steps of:

generating said first high frequency oscillation signal;

detecting the operation mode of said electronic apparatus by receiving a feedback signal from said output voltage so as to generate a mode detection signal;

generating a first or a second control signal according to whether or not said mode detection signal is activated; and transferring said first high frequency oscillation signal to said PWM control circuit upon receiving said first control signal or frequency-dividing said oscillation signal to generate a frequency divided reference signal supplied to said PWM control circuit upon receiving said second control signal.

* * * * *